United States Patent [19]
Lambdin, Jr. et al.

[11] 3,718,720
[45] Feb. 27, 1973

[54] METHOD FOR MANUFACTURING FIBROUS, CARBONACEOUS COMPOSITES HAVING NEAR ISOTROPIC PROPERTIES

[75] Inventors: Foraker Lambdin, Jr., Alcoa; William W. Randles, Knoxville, both of Tenn.

[73] Assignee: The United States of America as represented by the United States Atomic Energy Commission

[22] Filed: Jan. 12, 1971

[21] Appl. No.: 105,975

[52] U.S. Cl.............264/29, 264/DIG. 19, 423/448, 423/449
[51] Int. Cl.....B29c 25/00, C01b 31/00, C01b 31/07
[58] Field of Search...264/29, DIG. 19; 423/448, 449

[56] References Cited

UNITED STATES PATENTS

| | | | |
|---|---|---|---|
| 3,517,092 | 6/1970 | Peterson | 264/29 |
| 3,534,803 | 10/1970 | Bickerdike | 264/29 |
| 3,246,056 | 4/1966 | Shea, Jr. et al. | 264/29 |
| 3,462,289 | 8/1969 | Rohl et al. | 264/29 |
| 3,470,003 | 9/1969 | Waylett | 264/29 |
| 3,573,086 | 3/1971 | Lambdin, Jr. | 264/29 |
| 3,666,847 | 5/1972 | Bailey | 264/29 |

*Primary Examiner*—Lorenzo B. Hayes
*Assistant Examiner*—David A. Jackson
*Attorney*—Roland A. Anderson

[57] ABSTRACT

In the preparation of carbonaceous fiber composites a method has been found for controlling the orientation of the fibers whereby composites exhibiting near isotropic properties may be readily fabricated. The method comprises mixing discrete carbonaceous fibers with a particulate thermoplastic binder, heating the mixture sufficiently to melt the binder and attach the intermingled fibers at their nexus, cooling the attached fibers, crushing the fibrous mass into small agglomerates, forming the agglomerates into the desired shape, and thereafter heating the agglomerates to a temperature adequate for successively melting the binder to join together the fibers and converting the binder to carbon.

3 Claims, No Drawings

METHOD FOR MANUFACTURING FIBROUS, CARBONACEOUS COMPOSITES HAVING NEAR ISOTROPIC PROPERTIES

The present invention relates generally to the preparation of carbonaceous fiber composites, and more particularly to the preparation of such composites wherein the latter exhibit near isotropic properties. This invention was made in the course of, or under, a contract with the U.S. Atomic Energy Commission.

Fibrous carbonaceous composites are useful in high temperature applications particularly where high strength and resistance to ablation are desirable. For example, in aerospace applications such composites can be employed as rocket engine nozzles or as leading surfaces on reentry vehicles. In order to be used with any degree of satisfaction in high temperature environments the composites should possess uniform or near uniform coefficients of thermal expansion in all directions, i.e., thermal isotropy, throughout the entire temperature range to which the composites are subjected. If thermal anisotropy is present internal stresses are induced into the composite that are capable of destroying or otherwise detracting from the physical integrity of the latter. These deleterious internal stresses increase with increasing anisotropy. Further, thermal anisotropy causes some troublesome fabrication problems in that uneven shrinkage will occur in the major dimensions during composite densification and heat treatment steps. Previous efforts in fabricating fibrous composites by simple casting and dry molding techniques have been largely unsuccessful due to the occurrence of extensive fiber alignment which is responsible for causing the anisotropic properties in the composite.

Accordingly, it is the primary objective or aim of the present invention to provide a method whereby fibrous carbonaceous composites may be prepared by casting or dry molding so that the fibers are randomly oriented in the composites to impart near isotropic properties in the latter. This and other objectives are achieved by practicing the method of the present invention which comprises the steps of forming small agglomerates of carbonaceous fibers joined together primarily at their nexus by a thermoplastic binder, forming the agglomerates into the desired configuration for providing a structure incorporating randomly oriented fibers, and heating the shaped agglomerates to attach the agglomerates and convert the binder to carbon.

Other and further objects of the invention will be obvious upon an understanding of the illustrative method about to be described, or will be indicated in the appended claims, and various advantages not referred to herein will occur to one skilled in the art upon employment of the invention in practice.

Described generally, the present invention is primarily directed to a method of controlling fiber orientation in the preparation of fibrous carbonaceous composites by casting or molding so as to provide such composites with near isotropic properties or near uniform coefficients of thermal expansion in all directions. The method comprises the steps of mixing discrete carbonaceous fibers with a thermoplastic binder in particulate form, sufficiently heating the mixture to melt the binder and join together the intermingled fibers primarily at their cross-over points, cooling the mass of joined fibers, crushing and grinding the mass to form small agglomerates consisting of joined fibers and fiber segments, casting or molding the agglomerates into the desired configuration to provide a structure containing randomly oriented fibers, and thereafter sufficiently heating the agglomerates to remelt the binder for joining together the agglomerates and to convert the binder to a carbonaceous state.

The carbonaceous fibers employed in the method of the present invention may have a length-to-diameter ratio in the range of about 40–1,000 to 1, preferably about 125–250 to 1, and are intermingled with one another while they are mixed or blended with a particulate thermoplastic binder. The joining of the fibers is preferably achieved by confining the fibers and binder in a flexible bag or container and melting the thermoplastic binder in the mixture in a suitable furnace so that the melted binder flows along the fibers to the fiber junction or nexus and there forms droplets, each of which binds together two or more of the intermingled fibers at their junctions or cross-over points. During the heating step the bag holding the fibers and binder is continually evacuated so as to facilitate the formation of better agglomerates by urging the fibers into contiguous relationships with one another. The binder droplets remain at these cross-over points due to surface tension while substantially the remainder of the binder is distributed along the fiber length as a coating.

Cooling the fibrous mass of joined fibers may be accomplished by employing a moving air stream, a liquid nitrogen bath or any other suitable well-known cooling technique. After the fibrous mass has been cooled it is broken and then ground in a conventional grinding or shearing mill into small agglomerates. Because of the fiber reinforcing effect provided by the binder droplet at the nexus of the fibers the latter break preferentially a short distance from the binder droplets so as to form agglomerates having a plurality of fiber segments and intact fibers joined together in a single body. The broken fibrous mass is preferably ground until the cross section of the agglomerates is in a size range of about 250 to 750 microns.

The fibers employed in the present method are carbonaceous, i.e., either carbon or graphite, and the particular type and size of fiber used is determined by the desired composition of the final composite. For example, large diameter, high modulus, high strength fibers may be used to fabricate high strength composites or structures and long, small diameter, low strength and low modulus fibers may be used to fabricate high density composites for applications where resistance to ablation is desired which necessarily requires low porosity and high density.

The particulate thermoplastic binder employed in the fabrication of the agglomerates may be of any suitable commercially available resin having a melting temperature in the range of about 60°–160° C. and a particle size in the range of about 50–150 microns. Suitable binders include pitches with melting points of about 95°–120°C. and carbon yielding compounds such as isotruxene or acenaphthalene having melting points within the aforementioned range. The quantity of binder employed in the mixture is in the range of about 40–140 parts binder per hundred parts fiber.

The mixture of the fibers and the binder is preferably placed in a flexible bag and evacuated while in a furnace to effect the joining together of the fibers at their nexus. The furnace is preferably operated at a temperature of about 60°–160° C. with the higher temperature in this range being used with the binders having the higher melting points. Normally, a duration of about 8–12 hours at a vacuum of 25 in. Hg is sufficient to effect the desired joining together of the fibers. During the treatment of the fibers in a furnace the fibrous mixture is preferably placed in a suitable containment structure, such as a bag of a suitable material such as polyvinyl chloride, or the like, so that the applied vacuum will insure that the fibers remain in a contiguous relationship with one another during the fiber joining operation.

After forming the isotropic agglomerates as above described they may be fabricated into composites of the desired configuration by using conventional casting or dry molding techniques for providing structures, which upon carbonizing the binder at a temperature of in the range of about 900°–1,000° C. in an inert atmosphere such as argon or nitrogen, possess near isotropic properties and are of densities in the range of about 0.17–0.22 gm/cc. While the present invention is primarily directed to forming the agglomerates into structures by employing casting and molding techniques, other forming procedures may be used such as vibration molding, vacuum bag compaction, die pressing, hot isostatic pressing, pulp molding, or vacuum assisted spraying. The binder in the composites formed by these procedures is converted to a carbonaceous state in a manner similar to the binder in the composites formed by casting or molding procedures. Fibrous carbonaceous composites prepared from the isotropic fibrous agglomerates by using any of the above procedures may be further densified by using well-known resin impregnation and carbonization procedures. Also, if desired, the composites may be graphitized by heating the carbon composite to a temperature of about 2,500°–3,000° C. in an inert atmosphere such as argon or nitrogen.

In order to provide a clearer understanding of the present invention examples relating to typical fibrous composite fabrications in which the fiber-binder agglomerates of the present invention are employed are set forth below.

EXAMPLE I

A carbon fiber-carbon matrix cylinder having a length of 12 inches, an outside diameter of 4.50 inches, and a wall thickness of about 0.75 inch was prepared by blending 500 grams of carbon fibers having a length of 250 microns and a diameter of 2 microns with 500 grams of granular coal tar pitch which had an average particle size of about 100 microns and a melting point of about 95° C. The fiber-binder mixture was placed in a polyvinyl chloride bag and heated to about 130° C. for 12 hours while the bag was evacuated to 25 inches Hg. during which the fibers were joined together by binder droplets at their nexus. The fibrous mass was chilled in liquid nitrogen, broken into smaller portions, and then ground into agglomerates having a size range of approximately 250–750 microns in a high-energy shear mill. The agglomerates were packed into an annular type mold made by placing a solid graphite mandrel, having a diameter of 3 inches and a length of 12 inches, within a polyvinyl chloride bag having a 9-inch diameter and a 12-inch length. After the packed agglomerates were heated and outgassed at 130° C. for 8 hours, they were isostatically pressed to 5,000 psi in cold oil. The graphite mandrel was removed, and the pressed cylinder of agglomerates was placed in a furnace and carbonized in a nitrogen atmosphere by increasing the temperature to 900° C. at a rate of 100° C. per hour. The temperature was held constant for 2 hours. The resulting fibrous composite had a bulk density of 0.73 g/cc, a porosity of 54 percent, and an average pore diameter of 8.3 microns. The coefficients of thermal expansion of the composite from 25° to 1,000° C. were $1.98 \times 10^{-6}$ in/in/° C. in the circumferential direction, $1.89 \times 10^{-6}$ in/in/° C. in the axial direction, and $2.12 \times 10^{-6}$ in/in/° C. in the radial direction. The composite possesses near isotropic properties with a radial-to-axial coefficient ratio of 1.12.

EXAMPLE II

A hollow conical-shaped fibrous composite having a height of 18 inches, a diameter at the large end of about 9.5 inches, and a wall thickness of 1.5 inches was fabricated in the manner described in Example I. The coefficient of thermal expansion of the composite through a temperature increase from 25° to 1,000° C. was $2.3 \times 10^{-6}$ in/in/° C. in the circumferential direction, $2.17 \times 10^{-6}$ in/in/° C. in the axial direction, and $2.50 \times 10^{-6}$ in/in/° C. in the radial direction. The ratio of the radial-to-axial coefficients for this composite is 1.15.

EXAMPLE III

A conical-shaped fibrous composite having an outside diameter of 9.5 inches, a height of 18 inches, and a thickness of 1.5 inches was fabricated in the manner described in Example I. The composite was densified to 1.8 g/cc by six coal tar pitch impregnations and carbonizations at 1,000° C. and then graphitized at 3,000° C. Examination of closed hoops taken from the composite showed no observable residual stress which indicated that the composite possessed near isotropic properties.

EXAMPLE IV

A cylindrical fibrous composite was fabricated in the manner described in Example I. The cylindrical carbonized composite was machined to obtain an outside diameter of 4.25 inches, a height of 8 inches, and a wall thickness of 0.75 inch. The bulk density of the machined composite was 0.63 g/cc. After machining, the cylinder was densified by conventional vapor deposition to 1.10 g/cc and by 3 pitch impregnations and carbonizations at 1,000° C. to 1.60 g/cc and then graphitized at 3,000° C. The graphitized cylinder was strong and well formed. The ratio of the radial-to-axial coefficients of thermal expansion was 1.15 which indicates near isotropy.

As mentioned above the agglomerates can be formed into a desired configuration by procedures other than casting or dry molding. For example, the agglomerates can be substituted for the discrete fibers and particulate binder employed in the fiber-binder spraying process described in assignee's copending patent application Ser. No. 55,953 filed July 17, 1970, and entitled "Fibrous Carbonaceous Composites and Method for Manufacturing Same." In this process an aqueous slurry of fibers and a water-soluble starch is sprayed onto a porous mandrel, the excess water is removed, the starch is gelatinized, and the sprayed structure is then heated to a temperature sufficient to convert the starch to carbon and bind together the fibers. Carbonaceous cylinders formed by replacing the fibers in the process of the above described copending application with agglomerates of the present invention exhibited highly satisfactory thermal anisotropy. For example, two cylinders each having a 3-inch inner diameter, a wall thickness of 0.75 inch and an overall length of 10 inches when subjected to a temperature increase from room temperature to 1,000° C had radial coefficients of thermal expansion of $2.61 \times 10^{-6}$ in/in/° C. and $2.59 \times 10^{-6}$ in/in/° C. and longitudinal coefficients of thermal expansion of $2.61 \times 10^{-6}$ in/in/° C. and $2.46 \times 10^{-6}$ in/in/° C., respectively, which corresponded to isotropic ratios of 1.00 and 1.05.

It will be seen that the present invention affords a novel technique in the fabrication of carbonaceous fiber composites whereby thermal isotropy is readily achieved. The isotropic characteristics of composites manufactured by the present invention possess essentially near-isotropic properties with radial-to-axial coefficients of thermal expansion ratios in the range of about 1.0 to 1.3. On the other hand, well-known, relatively-complex, fibrous composite-forming procedures such as filament winding and spraying short fibers and resin without a carbonaceous filler form composites which have thermal expansion ratios of about 3 to 5 and about 1.7, respectively. In particular, the fiber-binder agglomerates of the present invention are desirable for the fabrication of hollow structures having a large wall thickness-to-diameter ratios.

What is claimed is:

1. A method of preparing a fibrous composite consisting of the steps of mixing a plurality of discrete carbonaceous fibers with a particulate thermoplastic resin binder, said fibers having a length-to-diameter ratio in the range of about 40–1,000 to 1 and said binder having a melting point in the range of about 60° to 160° C. and a particle size in the range of about 50 to 150 microns with the quantity of binder in the mixture being about 40 to 140 parts binder per hundred parts fiber, heating the mixture to a temperature of between 60° and 160° C for about 8–12 hours adequate to melt the binder for coupling together contiguously disposed fibers primarily at the junctures thereof, cooling the mixture to solidify the binder, grinding the mixture to provide agglomerates consisting of joined fibers and fiber segments in a size range of about 250 to 750 microns, forming the agglomerates into a desired configuration, and thereafter heating the agglomerates to a temperature adequate to successively remelt the binder for joining together the agglomerates and convert the binder to a carbonaceous state, said composite having near uniform coefficients of thermal expansion in all directions.

2. The method of preparing a fibrous composite as claimed in claim 1, wherein the binder is sufficiently melted during the step of heating the mixture to flow on said fibers and form droplets at said junctures.

3. The method of preparing a fibrous composite as claimed in claim 2, wherein the step of heating the mixture is achieved in a flexible container subjected to vacuum, and wherein excess binder forms a coating on said fibers.

* * * * *